(12) United States Patent
Kong et al.

(10) Patent No.: US 12,173,444 B2
(45) Date of Patent: Dec. 24, 2024

(54) CLOTHES TREATMENT APPARATUS

(71) Applicants: LG Electronics Inc., Seoul (KR); Seoul National University R&DB Foundation, Seoul (KR)

(72) Inventors: Taewoong Kong, Seoul (KR); Chaseung Jun, Seoul (KR); Sangwook Hong, Seoul (KR); Seungki Sul, Seoul (KR); Joohyun Lee, Gyeonggi-do (KR); Hwigon Kim, Gyeongsangnam-do (KR)

(73) Assignees: LG Electronics Inc., Seoul (KR); Seoul National University R&DB Foundation, Seoul (KR)

( * ) Notice: Subject to any disclaimer, the term of this patent is extended or adjusted under 35 U.S.C. 154(b) by 273 days.

(21) Appl. No.: 17/912,411

(22) PCT Filed: Mar. 16, 2021

(86) PCT No.: PCT/KR2021/003237
§ 371 (c)(1),
(2) Date: Sep. 16, 2022

(87) PCT Pub. No.: WO2021/187865
PCT Pub. Date: Sep. 23, 2021

(65) Prior Publication Data
US 2023/0124336 A1 Apr. 20, 2023

(30) Foreign Application Priority Data
Mar. 16, 2020 (KR) .......................... 10-2020-0032115
Mar. 16, 2021 (KR) .......................... 10-2021-0033988

(51) Int. Cl.
*D06F 34/14* (2020.01)
*D06F 23/02* (2006.01)
(Continued)

(52) U.S. Cl.
CPC .............. *D06F 34/14* (2020.02); *D06F 23/02* (2013.01); *D06F 37/06* (2013.01); *D06F 37/267* (2013.01);
(Continued)

(58) Field of Classification Search
None
See application file for complete search history.

(56) References Cited

U.S. PATENT DOCUMENTS 10,876,247 B2 * 12/2020 Kim ...................... D06F 37/267
2013/0119905 A1 5/2013 Bevilaqua et al.

FOREIGN PATENT DOCUMENTS

| CN | 208266494 | 12/2018 |
|---|---|---|
| JP | H0682316 | 3/1994 |

(Continued)

*Primary Examiner* — Rita P Adhlakha
(74) *Attorney, Agent, or Firm* — Fish & Richardson P.C.

(57) ABSTRACT

Disclosed is a clothes treatment apparatus. The clothes treatment apparatus of the present disclosure may comprise: a cabinet; a drum rotatably provided in the cabinet; an induction heater which is disposed outside the drum and heats the drum; a magnet which is fixed to the drum and of which a residual magnetic flux density changes depending on temperature; and a coil fixed to the outside of the drum and disposed at a position overlapping the magnet in the longitudinal direction of the central axis of rotation of the drum.

18 Claims, 12 Drawing Sheets

(51) Int. Cl.
  *D06F 37/06*   (2006.01)
  *D06F 37/26*   (2006.01)
  *D06F 39/04*   (2006.01)
  *F26B 3/20*    (2006.01)
  *G01K 7/36*    (2006.01)
  *H01F 7/02*    (2006.01)
  *H01F 7/20*    (2006.01)
  *H05B 6/10*    (2006.01)

(52) U.S. Cl.
  CPC ............... *D06F 39/04* (2013.01); *G01K 7/36* (2013.01); *H01F 7/02* (2013.01); *H01F 7/20* (2013.01); *H05B 6/107* (2013.01); *F26B 3/20* (2013.01)

(56) References Cited

FOREIGN PATENT DOCUMENTS

| | | |
|---|---|---|
| KR | 20110025469 | 3/2011 |
| KR | 20190022212 | 3/2019 |

* cited by examiner (a)　　　　　　　(b)

CLOTHES TREATMENT APPARATUS

CROSS-REFERENCE TO RELATED APPLICATIONS

This application is a National Stage application under 35 U.S.C. § 371 of International Application No. PCT/KR2021/003237, filed on Mar. 16, 2021, which claims the benefit of Korean Patent Application No. 10-2020-0032115, filed on Mar. 16, 2020, and Korean Patent Application No. 10-2021-0033988, filed on Mar. 16, 2021. The disclosures of the prior applications are incorporated by reference in their entirety.

TECHNICAL FIELD

The present disclosure relates to a clothes treatment apparatus having an induction heater.

BACKGROUND ART

In general, a clothes treatment apparatus may include a washing machine, a dryer, a device for refreshing clothes, and the like. The washing machine may be a washing machine with a drying function.

In the washing machine, a drum accommodating laundry is rotatably provided in a tub that provides a space for storing water. Through holes are formed in this drum, so that water in the tub flows into the drum. In this state, when the drum is rotated, the laundry in the drum flows and contaminants of the laundry is removed.

Such a washing machine is also provided with a heater for heating the water in the tub. The heater is generally operated in a state of being submerged in water in the tub, thereby directly heating the water. However, since this type of heater must always be operated in a state of being submerged in water for safety reasons, it can be used to heat the water in the tub but not suitable to heat air in the drum when there is no water in the tub or to heat wet laundry before spin-drying.

Recently, a washing machine with a drum capable of being heated by an induction heating system has been used. Such a washing machine may be configured to have a heat sensor disposed between the drum and a tank (or tub) to sense the temperature of water or air in the tank.

In this way, the temperature of the drum is inevitably estimated based on the temperature of water or air, but since the temperature of the drum is sensitively changed according to an output from the induction heating system, the temperature of water or air changes slowly, and thus, a value sensed by so the heat sensor may not exactly reflect the change in temperature of the drum.

Meanwhile, US Patent Application Publication No. US 2018/0148886 discloses a method of estimating temperature using a characteristic change of load (or drum) according to the temperature, especially an inductance change.

FIG. 1 shows a resonant circuit for employing this method.

Referring to FIG. 1, a resonance circuit 2 may be used to turn off driving of a power device Q1 near zero crossing of a grid voltage, and at this time, and in this case, a resonance frequency may be measured using an autonomously resonant voltage (fres).

An inductance (Leq) may be derived using the resonant frequency (fres) measured in this way and a relational expression $$f_{res} = \frac{1}{2\pi\sqrt{L_{eq}C_{eq}}}$$

showing a relationship among a resonant frequency, an inductance, and a capacitance.

Here, as the temperature increases, the relative magnetic permeability increases and the inductance (Leq) also increases. Therefore, the temperature of the drum (load) 1 can be estimated through the change in inductance (Leq) according to the temperature change.

FIG. 2 shows a voltage waveform when measuring a resonance frequency, and FIG. 3 shows an enlarged view of a part A shown in FIG. 2.

Referring to FIG. 2, it can be seen that a resonance frequency (fres) changes by about 0.015% when a load temperature changes by 1° C. That is, it can be seen that a variation of resonance frequency (fres) according to a change in temperature is too small to estimate the temperature using the resonance frequency.

That is, referring to FIG. 3, it can be seen that a portion of the waveform W after the circuit is turned off is small to measure a fluctuation.

In addition, a change in inductance (Leq) fluctuates by 0.03%/° C. That is, the change in inductance (Leq) may fluctuate by 0.03% depending on the temperature. In addition, a capacitance (Ceq) in a formula for calculating the resonant frequency (fres) should be less than 0.003% depending on a dispersion of components and a dispersion of temperature changes.

FIG. 4 is a graph illustrating a relationship between a temperature and a resonance frequency when estimating the temperature using the resonance frequency.

Due to the circumstances described above, when the temperature is estimated using the resonant frequency, an error of the estimated temperature may occur by about ±10° C. or more. However, in order to apply the above-described method to general washing machines, accuracy within ±5° C. is required.

In addition, there is a problem in that power of the circuit must be turned off for a predetermined time in order to measure a resonance frequency of (fres).

Therefore, an improvement or a new method of estimating temperature of a drum accurately by solving the aforementioned problems is required.

SUMMARY

An aspect of the present disclosure is to solve the above and other problems.

Another object of the present disclosure provides a clothes treatment apparatus such as a dryer, a washing machine or a dryer combined with a washing machine, or an apparatus for refreshing clothes.

Yet another object of the present disclosure provides a clothes treatment apparatus capable of heating a drum with an induction heater and accurately estimating temperature of the drum.

Yet another object of the present disclosure provides a clothes treatment apparatus capable of accurately estimating temperature of a drum by minimizing influence of a magnetic field generated by an induction heater.

Yet another object of the present disclosure provides a clothes treatment apparatus capable of accurately estimating temperature of a drum regardless of a distance between a load (drum) and a tub.

Yet another object of the present disclosure provides a clothes treatment apparatus capable of estimating temperature of a rotating load (drum).

Yet another object of the present disclosure provides a clothes treatment apparatus capable of continuously estimating temperature, without turning off a power device in order to estimate the temperature.

Yet another object of the present disclosure provides a clothes treatment apparatus capable of minimizing vibration due to unbalance even when a drum including a magnet rotates at a high speed in order to estimate the temperature.

In an aspect of the present disclosure, a clothes treatment apparatus includes a magnet and a coil.

The magnet may be provided to be movable with respect to the coil.

The clothes treatment apparatus includes a drum rotatably provided.

The coil may be fixed to an outside of the drum. The coil may be disposed at a position overlapping the magnet in a longitudinal direction of a central axis of rotation of the drum.

The magnet may be fixed to the drum. The magnet may have a residual magnetic flux density that varies depending on temperature.

The magnet may be disposed at a position where a straight line passing through the coil and perpendicular to a rotation center line of the drum meets the drum. The magnet may be disposed at a portion of the drum which passes a point at a shortest distance from the coil according to rotation of the drum.

The magnet may be disposed at an outer circumferential surface of the drum.

The clothes treatment apparatus includes an induction heater that heats the drum. The induction heater may generate a magnetic field. The induction heater heats the drum using the magnetic field.

The induction heater may be fixed to the outside of the drum.

The clothes treatment apparatus may include a cabinet. The cabinet may form an exterior of the clothes treatment apparatus.

The drum may be rotatably provided in the cabinet.

The drum may include a body in an elongated cylindrical shape and through holes formed in the body.

The clothes treatment apparatus may further include a non-magnetic counterbalance part. The counterbalance parts may be provided as one or more balance counter parts.

The counterbalance part may be provided in the drum. The magnet and the one or more counterbalance part may be arranged at regular intervals along a circumferential direction of the drum.

The clothes treatment apparatus may further include a lifter provided at an inner circumferential surface of the drum. The lifter may include a plurality of lifters arranged at regular intervals along a circumferential direction of the drum. The lifter may protrude from the inner circumferential surface of the drum.

The magnet may be disposed at an outer surface of a portion of the drum where the lifter is disposed. The magnet may be disposed at a position corresponding to the lifter. The magnet may face the lifter.

The magnet may be disposed at an outer surface of a portion of the drum where any one of the plurality of lifters is disposed. The magnet may be disposed at a position corresponding to the any one of the lifters. The magnet may face the any one of the lifters.

The counterbalance part may be provided inside other lifters among the plurality of lifters.

The coil may be disposed on the opposite side of the induction heater with respect to a center of the drum. The coil may be disposed within a range of ±60 degrees from an opposite point of the induction heater with respect to the center of the drum.

The clothes treatment apparatus may include a controller connected to the coil. The controller may estimate the temperature of the drum.

A magnetic flux density of the magnet passing through the coil may change according to rotation of the drum. A counter electromotive force may be induced in the coil according to a change in magnetic flux density passing through the coil.

The controller may estimate the temperature of the drum based on the counter electromotive force induced in the coil.

The magnet may be a ferrite magnet.

The clothes treatment apparatus may be a dryer. The clothes treatment apparatus may be a dryer that does not include a tub.

The coil may be fixed to the inside of the cabinet in the outside of the drum. The coil may be fixed to a bottom surface of the cabinet. The coil may be fixed to an inner surface of the cabinet.

The induction heater may be disposed inside or at an inner wall of the cabinet. In a tub-free clothes treatment apparatus such as a dryer, the induction heater may be located at an upper side, a lower side, a left side, or a right side of the drum in a cabinet spaced apart from the drum. The coil may be positioned at a position opposite to the induction heater or may be fixed to be spaced apart from the drum at a position spaced apart from the induction heater with respect to a rotation direction of the drum.

The clothes treatment apparatus may be an integrated washer-dryer that performs washing and drying. The clothes treatment apparatus may be an integrated washer-dryer including a tub.

The tub may be disposed inside the cabinet. The tub may accommodate the drum. The tub may provide a space for storing water.

The drum may be rotatably provided in the tub.

The coil may be installed in the tub. The coil may be fixed to the tub. The coil may be disposed at a position overlapping the magnet in a longitudinal direction of a central axis of rotation of the drum.

The induction heater may be fixed to the tub. The induction heater may be disposed on an outer circumferential surface of the tub. The induction heater may be spaced apart from the drum.

The coil may be disposed on the opposite side of the induction heater with respect to a center of the tub. The coil may be disposed within a range of ±60 degrees from an opposite point of the induction heater with respect to the center of the tub.

According to the present disclosure, when a permanent magnet is attached to the drum of the clothes treatment apparatus and rotates, temperature of a rotating load (drum) may be estimated using a voltage (counter electromotive force) that is induced in a pickup coil installed in a tub equipped with an induction heater.

In a specific example, a primary side may be configured with a pickup coil and a secondary side may be configured with a permanent magnet.

The primary side may be attached in the opposite direction to minimize a magnetic effect of the induction coil, and the secondary side may be attached by using a structure to an outside of one of the lifters located inside the load (drum).

In this state, as the load (drum) rotates, when the permanent magnet attached to the inside of the lifter of the load (drum) passes the pickup coil, a predetermined voltage (counter electromotive force) is induced in the pickup coil.

As described above, the temperature of the load (drum) may be estimated by using a characteristic that the voltage (counter electromotive force) induced in the pickup coil decreases at a predetermined rate as the temperature of the permanent magnet increases.

As a specific example for the above, an embodiment of the present disclosure provides a clothes treatment apparatus including: a cabinet; a drum rotatably provided in the cabinet; an induction heater disposed outside the drum and heating the drum; a magnet fixed to the drum and having a residual magnetic flux density that changes depending on temperature; and a coil fixed to the outside of the drum and disposed to overlap the magnet in a longitudinal direction of a central axis of rotation of the drum.

Another embodiment of the present disclosure may include a tub; a drum rotatably provided in the tub and accommodating an object; an induction heater fixed to the tub while being spaced apart from the drum to heat the drum; a coil installed in the tub; and a magnet installed at an outer surface of the drum and positioned to pass through a point which interacts with the pickup coil while the drum rotates.

In addition, the magnet may include a permanent magnet whose residual magnetic flux density changes depending on temperature.

In addition, the magnet may be a ferrite magnet.

In addition, the magnet may be installed at the outer surface of the drum.

In addition, the magnet may be installed on an opposing surface of a lifter installation position in the drum.

In addition, the pickup coil may be installed on the tub within a range of ±60 degrees from the opposite side of the induction heater.

In addition, the magnet may be installed at a position passing a shortest distance from the pickup coil according to rotation of the drum.

In addition, the drum may further include a counterbalance part installed at a position that bisects an angle of the drum with respect to a position to which the magnet is attached.

The controller may further include a controller connected to the pickup coil and configured to estimate the temperature of the drum by using a counter electromotive force value transmitted by interaction between the pickup coil and the magnet.

Also, the controller may estimate the temperature of the drum by using a characteristic that a voltage induced in the pickup coil decreases at a predetermined rate as the temperature of the magnet increases.

Yet another embodiment of the present disclosure includes a fixing part such as the cabinet, a rotating part rotating with respect to the fixing part, and a coil is disposed in the fixing part, and a magnet is disposed at a position corresponding to the coil in the rotating part. The magnetic flux density passing through the coil changes according to the rotation of the rotating part, and a counter electromotive force is induced in the coil. Provided is a clothes treatment apparatus in which a residual magnetic flux density of the magnet changes according to temperature of the rotating part and the temperature of the rotating part is determined based on a value of the counter electromotive force.

The fixing part may be an inner wall of the cabinet or any position inside the cabinet, and may be a tub disposed inside the cabinet to accommodate the rotating part.

In a dryer or clothes treatment apparatus without a tub, the coil may be disposed at an inner wall of the cabinet outside the rotating part.

The rotating part includes a drum disposed to rotate inside the cabinet or the tub. The magnet is disposed at the drum, and may be disposed at an outer surface or an inner surface of the drum.

A lifter may be provided inside the drum, and the magnet may be disposed in a drum area corresponding to the lifter. The magnet may be disposed at the outer surface of the drum corresponding to the lifter or at the inner surface of the drum on which the lifter is mounted.

The coil and the magnet are arranged to overlap each other in the longitudinal direction of the drum.

Yet another embodiment of the present disclosure provides a method of controlling a clothes treatment apparatus, the method including driving the clothes treatment apparatus; sensing a counter electromotive force through the pickup coil; and estimating temperature of the drum by using a magnitude of the counter electromotive force.

In addition, in the estimating of the temperature of the drum, the temperature of the drum may be estimated by using a value of a counter electromotive force according to a change in the residual magnetic flux density of the magnet depending on the temperature of the drum.

Further, the driving of the clothes treatment apparatus may include heating and rotating the drum.

Further, the driving of the clothes treatment apparatus may include aligning the pickup coil and the magnet.

Further, the estimating of the temperature of the drum may include estimating the temperature of the drum using a characteristic that a voltage induced in the pickup coil decreases at a predetermined rate as the temperature of the magnet increases.

According to the present disclosure, there may be effects as follows.

First, it may be possible to accurately estimate temperature of a drum by using a characteristic of a magnet that a residual magnetic flux density decreases as temperature increases.

In addition, it may be possible to estimate temperature regardless of a gap structurally caused due to a load (drum) and a tub.

In addition, it is possible to accurately estimate temperature even under a condition in which a load (drum) is rotating.

Without turning off a power device in order to estimate temperature, it is possible to continuously estimate the temperature, thereby yielding high efficiency when a product is applied.

DESCRIPTION OF EXEMPLARY EMBODIMENTS

Figure 1:
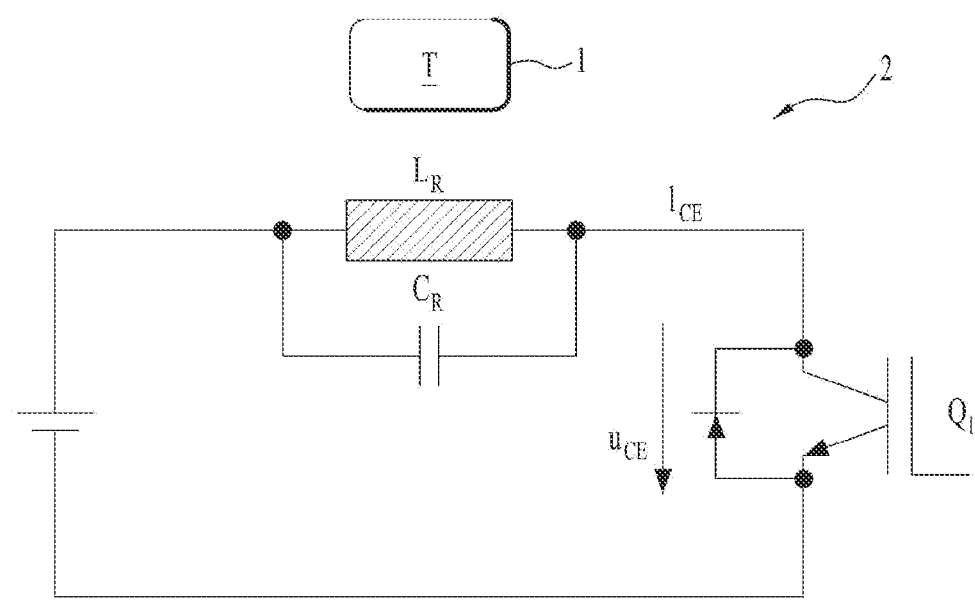
FIG. 1 is a resonant circuit for employing a method of estimating a temperature using an inductance change.
Figure 2:
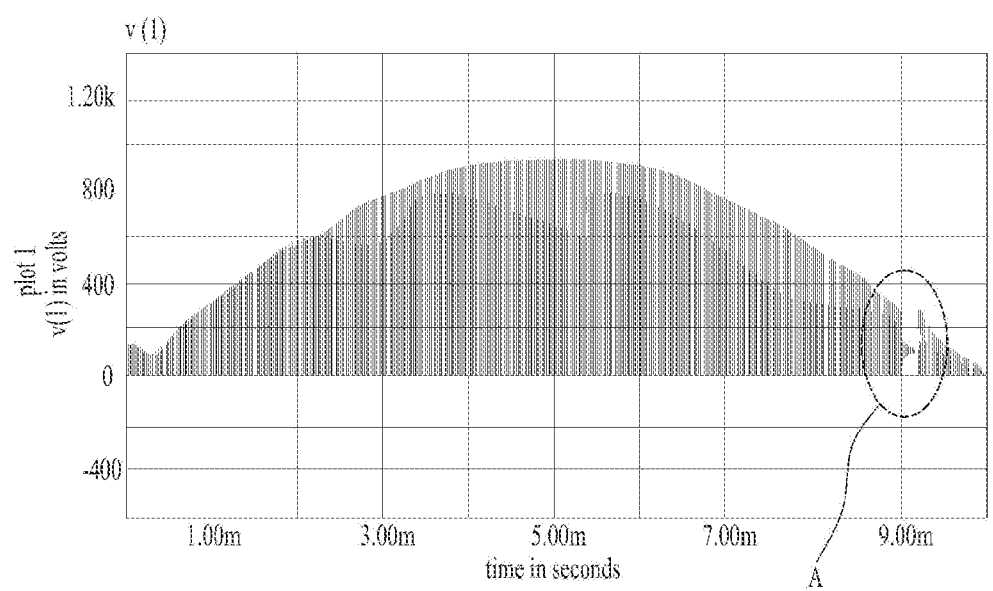
FIG. 2 shows a voltage waveform when a resonance frequency is measured in the resonance circuit shown in FIG. 1.
Figure 3:
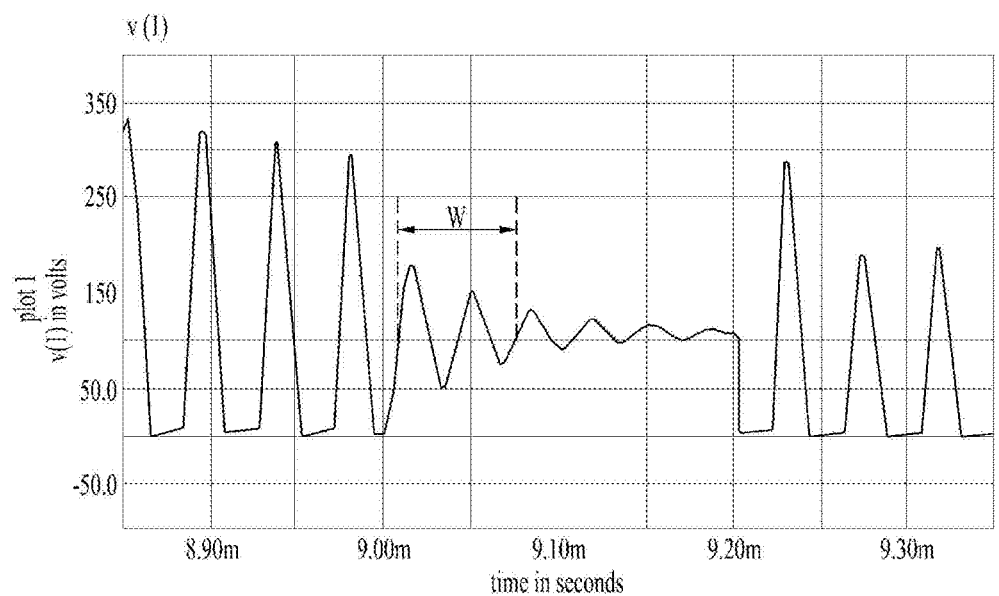
FIG. 3 is an enlarged view of part A of FIG. 2.
Figure 4:
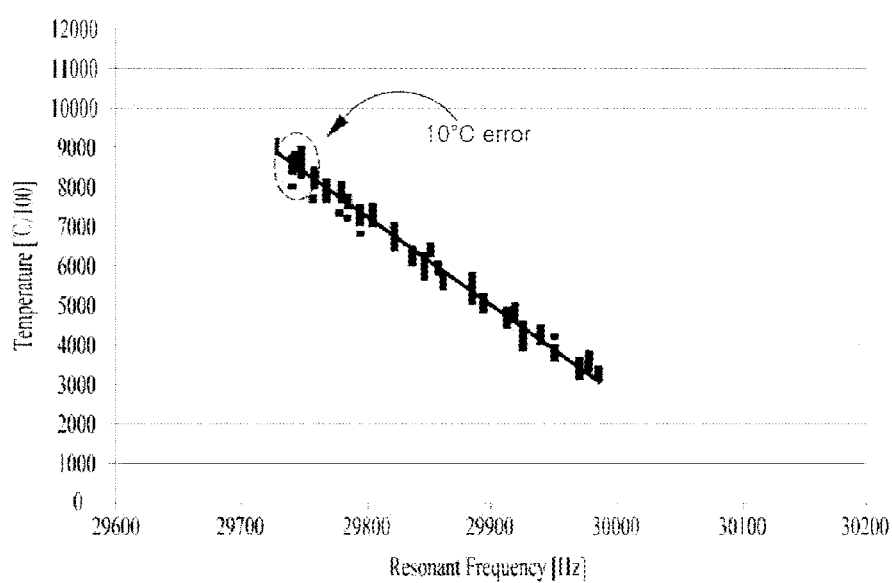
FIG. 4 is a graph illustrating a relationship between a temperature and a resonance frequency when estimating the temperature using the resonance frequency.

Hereinafter, description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

In addition, in the following description of the embodiments, a detailed description of known functions and configurations incorporated herein will be omitted when it may impede the understanding of the embodiments. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While terms including ordinal numbers, such as "first" and "second," etc., may be used to describe various components, such components are not limited by the above terms. The above terms are used only to distinguish one component from another.

It will be understood that when an element is referred to as being "connected with" or "coupled to" another element, the element can be connected with or coupled to the other element or intervening elements may also be present. In contrast, when an element is referred to as being "directly connected with" or "directly coupled to" another element, there are no intervening elements present.

In addition, it will be understood that, when an element, such as a layer, a region, or a module, is "on" another element, the element may be located "directly on" the other element and other elements may be interposed between both elements.

As used herein, the singular forms "a," "an" and "the" are intended to include the plural forms as well, unless the context clearly indicates otherwise.

Furthermore, although each drawing is described for convenience of explanation, it is also possible that another embodiment realized by those skilled in the art by combining at least two or more drawings may also falls within the scope of the present disclosure.

A clothes treatment apparatus of the present disclosure may correspond to a washing machine, a dryer, and a dryer-integrated washing machine (integrated washer-dryer). Hereinafter, a washing machine will be described as a representative example of the clothes treatment apparatus of the present disclosure. However, the clothes treatment apparatus of the present disclosure is not limited thereto.

Hereinafter, a clothes treatment apparatus according to an embodiment of the present disclosure will be described with reference to FIGS. 5 to 7.

Figure 5:
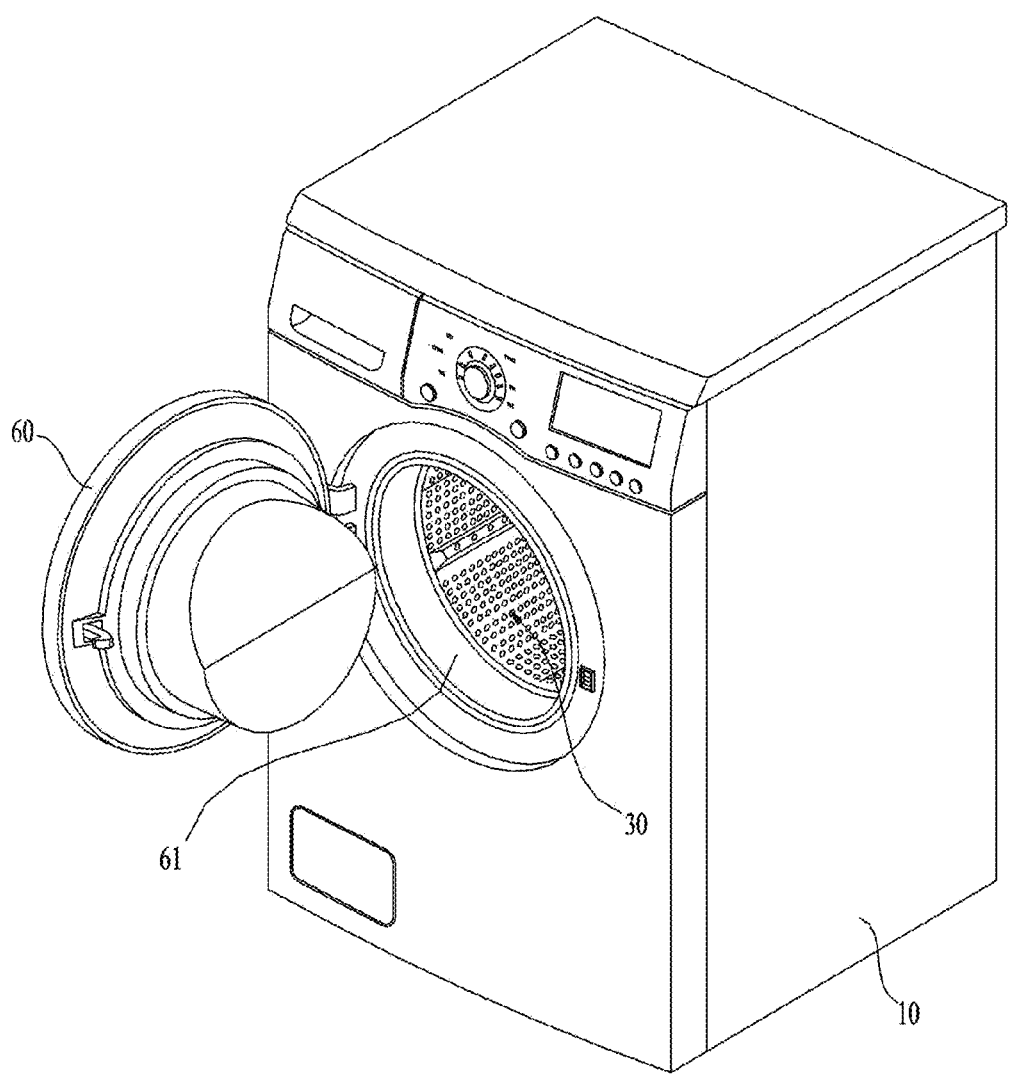
FIG. 5 is a perspective view illustrating the outside of a clothes treatment apparatus according to an embodiment of the present disclosure.

FIG. 5 is a perspective view illustrating the outside of a clothes treatment apparatus according to an embodiment of the present disclosure. FIG. 6 is a cross-sectional view illustrating the interior of a clothes treatment apparatus according to an embodiment of the present disclosure. FIG. 7 is a conceptual diagram in which a separate-type induction heater module is mounted on a tub.

A washing machine according to an embodiment of the present disclosure may include a drum 30 and an induction heater 70 provided to heat the drum 30. The washing machine may further include a cabinet 10 forming an exterior. The washing machine may further include a tub 20.

The tub 20 may be provided inside the cabinet 10. The tub 20 may provide an accommodation space. The tub 20 may accommodate washing water. The tub 20 may be provided to accommodate the drum 30.

The drum 30 may be rotatably provided inside the cabinet 10. The drum 30 may be rotatably provided inside the tub 20. The drum 30 may provide a space for accommodating laundry. An opening may be provided at a front of the drum 30, so that laundry can be put into the drum 30.

Through holes 30h may be formed in a circumferential surface of the drum 30 so that air and wash water can communicate with each other between the tub 20 and the drum 30. Hereinafter, the circumferential surface of the drum 30 is also referred to as a body of the drum 30. The body of the drum 30 may extend in a cylindrical shape.

The drum 30 may be formed of a conductor. The body of the drum 30 may be formed of a conductor. The body of the drum 30 may be formed of metal.

The induction heater or IH module 70 may heat the drum 30. The induction heater 70 may generate a magnetic field. The induction heater 70 may be provided to heat the drum 30 using the magnetic field.

The induction heater 70 may be provided at an outer circumferential surface of the tub 20. The induction heater 70 may be provided on the tub 20. The induction heater 70 may be fixed to the tub 20. The induction heater 70 may be spaced apart from the drum 30.

Alternatively, the induction heater 70 may be disposed outside the drum 30 in the cabinet 10. The induction heater 70 may be fixed to an inner wall of the cabinet 10. The induction heater 70 may be spaced apart from the drum 30.

The tub 20 and the drum 30 may be each formed in a cylindrical shape. Inner and outer circumferential surfaces of the tub 20 and the drum 30 may be each formed in a substantially cylindrical shape.

Figure 6:
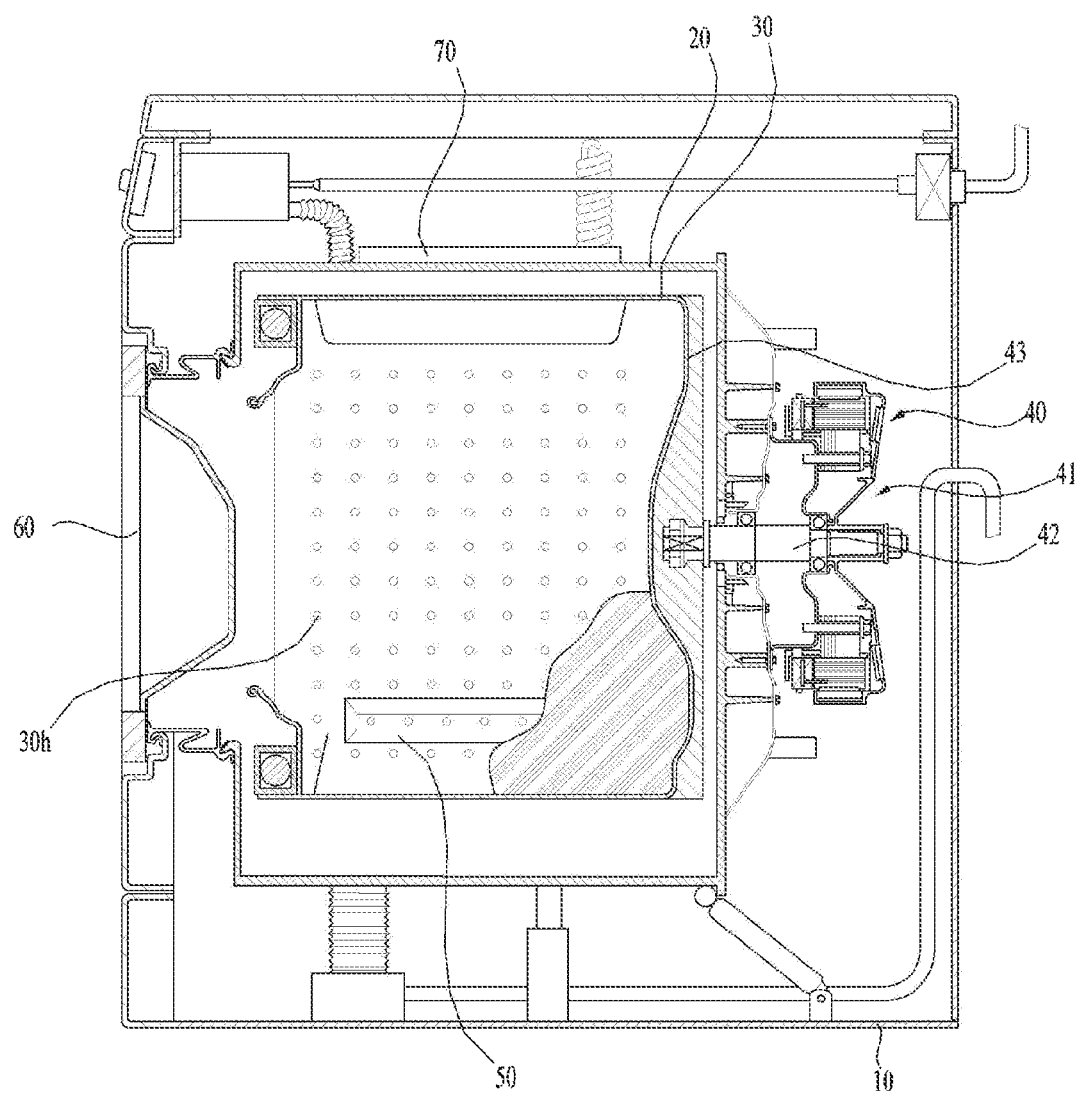
FIG. 6 is a cross-sectional view illustrating the interior of a clothes treatment apparatus according to an embodiment of the present disclosure.

FIG. 6 shows a clothes treatment apparatus in which the drum 30 rotates about a rotational shaft parallel to the ground. Unlike the drawing, the drum 30 and the tub 20 may each have a tilting shape that tilts to the rear. The rotational shaft of the drum 30 may pass through the rear surface of the clothes treatment apparatus. That is, a straight line extending from a rotational shaft 42 of a driver 40 may pass through a rear surface of the clothes treatment apparatus.

The washing machine may further include the driver 40 provided to rotate the drum 30 inside the tub 20. The driver 40 may include a motor 41. The motor 41 may include the rotational shaft 42. The rotational shaft 42 may be connected to the drum 30 to rotate the drum 30 inside the tub 20 and/or the cabinet 10.

The motor 41 may include a stator and a rotor. The rotor may be connected to the rotational shaft 42.

The driver 40 may include a spider 43. The spider 43 may be an element that connects the drum 30 and the rotational shaft 42 and uniformly and stably transmits a rotational force of the rotational shaft 42 to the drum 30.

The spider 43 may be coupled to the drum 30 while at least partially inserted into a rear wall of the drum 30. To this end, the rear wall of the drum 30 may be formed in a shape recessed inward of the drum 30. In addition, the spider 43 may be coupled to the drum 30 while further inserted into the drum 30 at a center of rotation of the drum 30.

A lifter 50 may be provided inside the drum 30. A plurality of lifters 50 may be provided along a circumferential direction of the drum 30. The lifter 50 may perform a function of agitating laundry. For example, in response to rotation of the drum 30, the lifter 50 lifts the laundry upward.

The laundry moved upward is separated from the lifter 50 due to gravity and falls downward. Washing may be performed by an impact force caused by the falling of the laundry. The agitation of the laundry may enhance drying efficiency.

The lifter 50 may be formed by extending from a rear end of to a front end of the drum 30. The laundry may be evenly distributed back and forth in the drum 30.

The induction heater 70 is a device for heating the drum 30.

Figure 7:
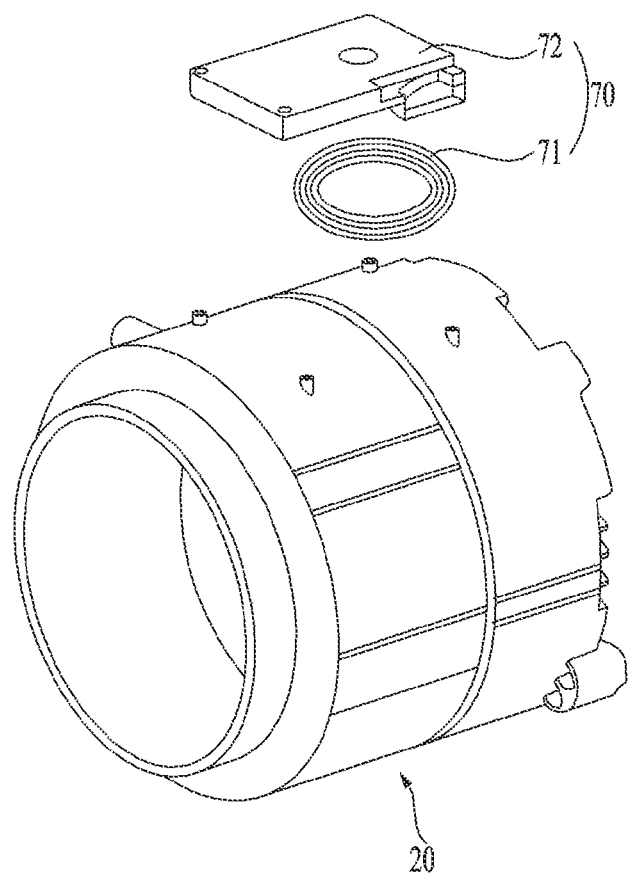
FIG. 7 is a conceptual diagram in which a separate-type induction heater module is mounted on a tub.

As shown in FIG. 7, the induction heater 70 may include a coil 71 that receives a current to generate a magnetic field. The coil 71 may generate an eddy current in the drum 30. Hereinafter, the coil 71 of the induction heater 70 may be referred to as a heater coil 71 to be distinguishable from a coil 90 which will be described later.

The induction heater 70 may include a heater cover 72 that accommodates the coil 71. Hereinafter, descriptions about the structure of the induction heater 70 and the principle on how the induction heater 70 heats the drum 30 will be omitted.

In the washing machine, the coil 71 may increase temperature inside the drum 30 as well as the drum 30 itself by heating the drum 30. By heating the drum 30, the induction heater 70 may heat the wash water in contact with the drum 30. The induction heater 70 may heat the laundry in contact with the inner circumferential surface of the drum 30. By increasing the temperature inside the drum 30, the induction heater 70 may heat the laundry that is not in contact with the inner circumferential surface of the drum 30.

The induction heater 70 may increase the washing water, laundry, and the ambient temperature inside the drum 30, thereby enhancing the washing performance. The induction heater 70 may dry the laundry by increasing the laundry, the drum 30, and the ambient temperature inside the drum 30.

Although FIG. 7 illustrates an example where the induction heater 70 is provided on the tub 20, it does not exclude that the induction heater 70 is provided on at least one of the upper side, lower side, and both sides of the tub 20. The induction heater 70 may be installed at a position higher than a maximum water level for the wash water stored in the tub 20.

Furthermore, the clothes treatment apparatus such as a dryer may not include the tub 20, and the induction heater 70 may be installed at an inner wall of the cabinet 10.

The induction heater 70 may be provided at one side of the outer circumferential surface of the tub 20. The coil 71 may be provided by winding the induction heater 70 in the cover 72 at least once along a surface adjacent to the tub 20.

The induction heater 70 may generate an eddy current in the drum 30 by radiating an induced magnetic field directly on the outer circumferential surface of the drum 30, and consequently may directly heat the outer circumferential surface of the drum 30.

The clothes treatment apparatus according to an embodiment of the present disclosure may include a controller (which may be the same element as a controller 91 shown in FIG. 8; hereinafter, the controller will be described using reference number 91) for controlling output of the induction heater 70. The controller 91 may control turning on/off and output of the induction heater 70.

The induction heater 70 may receive power by being connected to an external power supply source via an electric wire. Alternatively, the induction heater 70 may be connected to the controller 91, which controls the operation of the washing machine, to receive power. The induction heater 70 may receive power from anywhere as long as the induction heater 70 is able to supply power to an internal coil 71.

When electric power is supplied to the induction heater 70 and AC current flows through the coil 71 provided in the induction heater 70, the drum 30 is heated.

When electric power is supplied to the induction heater 70 but the drum 30 does not rotate, only some surface portions of the drum 30 is heated, and thus, the corresponding portions may be overheated and the remaining portions of the drum 30 may not be heated or may be less heated. In addition, heat may not be smoothly supplied to the laundry accommodated in the drum 30.

When the induction heater 70 is operated, the controller 91 may rotate the drum 30 through the motor 41 of the driver 40. The controller 85 may cause the induction heater 70 to operate once the drum 30 rotates.

When all of the outer circumferential surface of the drum 30 can face the induction heater 70, a speed at which the motor 41 of the driver 40 rotates the drum 30 may be any speed.

Meanwhile, as the drum 30 rotates, all surfaces of the drum 30 may be heated, and the laundry inside the drum 30 may be evenly exposed to heat.

Accordingly, in the clothes treatment apparatus according to an embodiment of the present disclosure, even in a case where the induction heater 70 is installed at only one of the upper, lower, and both sides of the outer circumferential surface of the tub 20, it is possible to evenly heat the outer circumferential surface of the drum 30.

According to an embodiment of the present disclosure, the induction heater 70 may heat the drum 30 to a high temperature within a very short time. The induction heater 70 may heat the drum 30 to a target temperature within a very short time. The induction heater 70 may heat the drum 30 to 120° C. or higher within a very short time.

When the induction heater 70 is driven while the drum 30 is stopped or rotating at a very slow rotating speed, a specific portion of the drum 30 may be overheated very quickly. When the induction heater 70 is driven in a state in which the drum 30 is stopped or at a very slow rotating speed, heat may not be sufficiently transferred from the heated drum 30 to the laundry.

A correlation between the rotating speed of the drum 30 and the driving of the induction heater 70 may be very important. It may be more advantageous to rotate the drum 30 and drive the induction heater 70 than to drive the induction heater 70 and rotate the drum 30.

Figure 8:
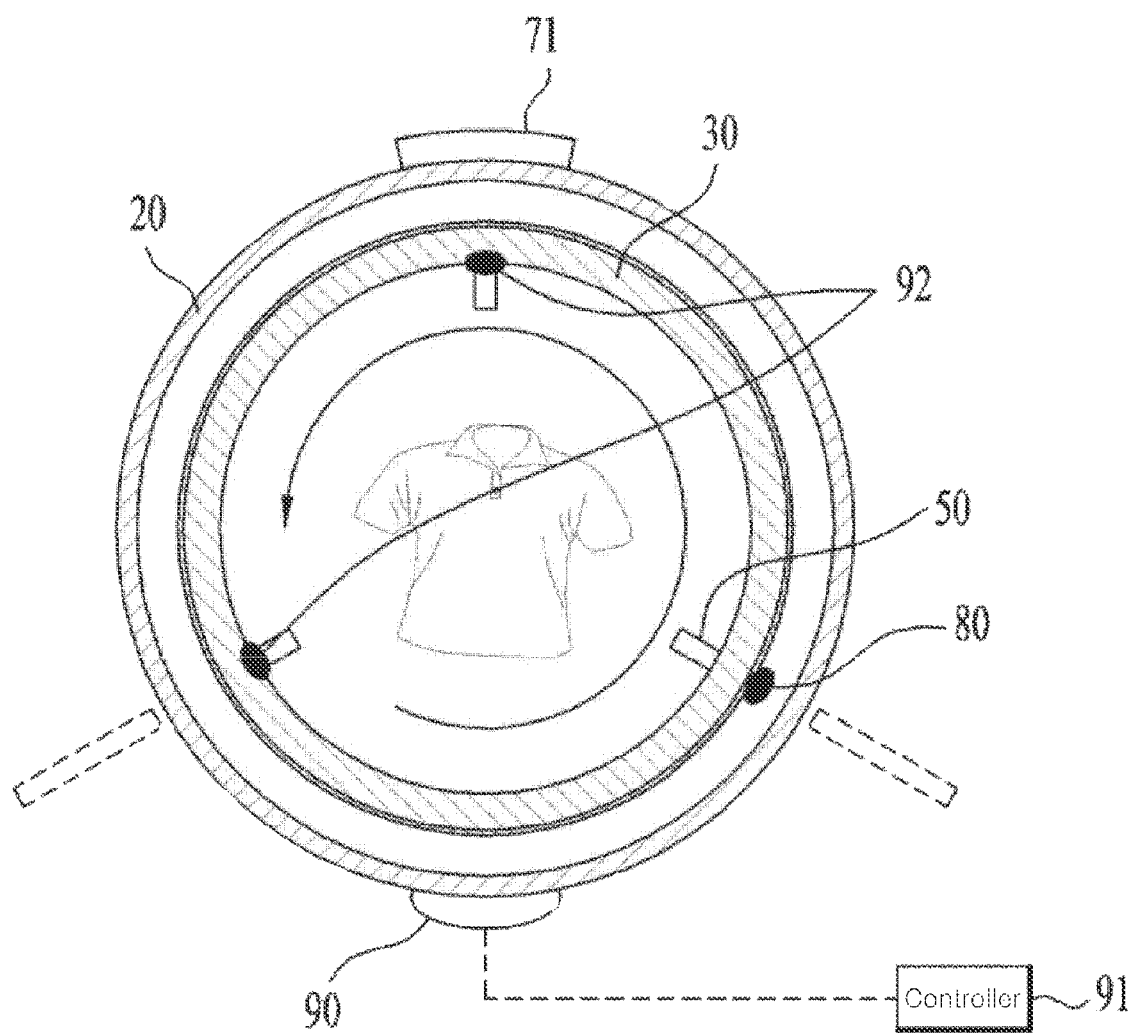
FIG. 8 is a schematic diagram illustrating a configuration of a clothes treatment apparatus according to an embodiment of the present disclosure.

FIG. 8 is a schematic diagram illustrating a configuration of a clothes treatment apparatus according to an embodiment of the present disclosure.

Hereinafter, a configuration of a clothes treatment apparatus according to an embodiment of the present disclosure will be described in detail with reference to FIG. 8.

The clothes treatment apparatus according to an embodiment of the present disclosure includes the coil 90 installed outside the drum 30 and a magnet 80 installed on the drum 30. The magnet 80 may be installed on the drum 30 and rotate integrally with the drum 30. The magnet 80 may be disposed at a position that passes through a point which interacts with the coil 90 while the drum 30 rotates. Hereinafter, the coil 90 may be referred to as a sensing coil 90 to be distinguishable from the coil 71 of the induction heater 70.

A magnetic flux density of the magnet 80 passing through the coil 9X) may change according to rotation of the drum 30. Accordingly, an induced electromotive force (counter electromotive force) may be generated in the coil 90.

For example, the coil 90 may be a pickup coil. The pickup coil refers to a coil in which a voltage is induced when passing through a permanent magnet.

The clothes treatment apparatus according to an embodiment of the present disclosure may include the controller 91 that estimates temperature of the drum 30 based on a value of a counter electromotive force generated by the interaction between the coil 90 and the magnet 80. The controller 91 may be connected to the coil 90.

The magnet 80 may have a residual magnetic flux density that changes according to the temperature. The magnet 80 may include a permanent magnet in which a residual magnetic flux density changes according to the temperature.

The residual magnetic flux density of the magnet 80 may decrease constantly as the temperature increases. In an example, in the case of a ferrite magnet, which is a type of permanent magnet, the residual magnetic flux density may change at a rate of −0.2%/° C. That is, when the temperature of the magnet increases by 1° C., the residual magnetic flux density may decrease by 0.2%.

Figure 12:
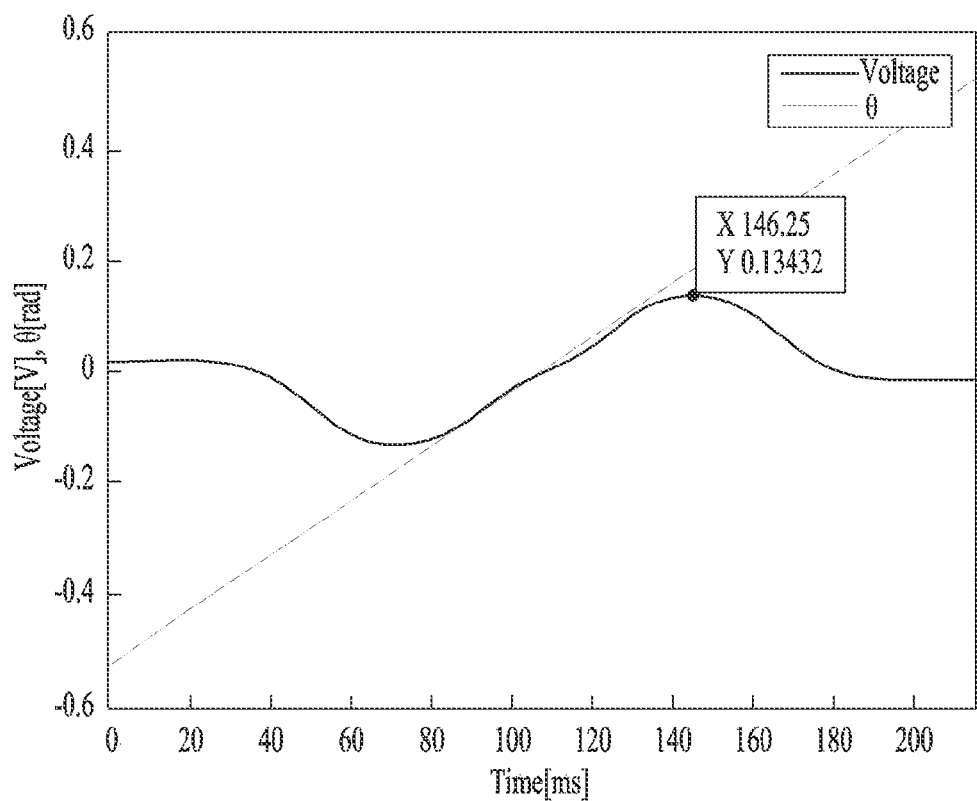
FIG. 12 is a graph illustrating a state in which a voltage is induced in a pickup coil of a clothes treatment apparatus according to an embodiment of the present disclosure.

When the permanent magnet is attached to the drum 30 of the dryer or washing machine and the drum 30 is rotated, a specific voltage may be induced at a portion where a strong magnetic field of the permanent magnet is generated (see FIG. 12).

An induced voltage (counter electromotive force) may change by a magnetic flux density of the permanent magnet. Since the magnetic flux density changes according to the temperature of the permanent magnet, the temperature of the drum 30 may be estimated using the induced voltage (counter electromotive force).

Referring to FIG. 8, the coil 90 may be installed on the tub 20 on the opposite side of the induction heater 70. The coil 90 may be installed on the tub 20 on the opposite side of the heater coil 71.

In addition, the coil 90 may be installed on the tub 20 at a position in a range of ±60 degrees from the opposite side of the induction heater 70. The coil 90 may be installed on the tub 20 at a position in a range of ±60 degrees from the opposite side of the heater coil 71.

For example, in the case of a washing machine, the coil 9X) may be attached to the tub 20. The coil 90 may be attached on the tub 20 at a position in the opposite direction of the coil 71 of the induction heater 70 in order to minimize the effect of a magnetic field generated in the coil 71 of the induction heater 70.

Meanwhile, when there is no installation space in the opposite direction of the coil 71 of the induction heater 70 on the tub 20 due to other washing heaters, etc., the pickup coil 90 may be installed on the tub 20 within a portion between the positions of adjacent lifters indicated by the dotted line in FIG. 8, that is, in a range within ±60 degrees from the opposite side of the coil 71 of the induction heater 70.

For example, the lifters 50 for lifting laundry may be installed inside the drum 30 at equal intervals. In this case, the magnet 80 may be installed at a position of one of these lifters 50. For example, when three lifters 50 are installed at equal intervals on the inner circumference of the drum, an angle between the lifters 50 may be 120 degrees. When these lifters 50 are aligned as shown in FIG. 8, the pickup coil 90 may be installed within a range of two lower lifters 50.

The magnet 80 may be installed at a position passing through a shortest distance from the coil 90 according to rotation of the drum 30. That is, when the drum 30 rotates, the magnet 80 installed at the drum 30 may pass through a position at the shortest distance from the coil 90.

The magnet 80 may be installed at an outer side of the drum 30, which corresponds to a position of a lifter 50 of the drum 30. Here, the dotted line in FIG. 8 indicates the position of the lifter 50.

This is because, when the magnet 80 is installed inside the drum 30, it is not possible to transmit a magnetic force to the pickup coil 90 due to a material characteristics of the load (drum) 30.

In the meantime, a counterbalance part 92 may be provided at a position that bisects a circular angle of the drum 30 with respect to a position where the magnet 80 of the drum 30 is attached, that is, at a position of another lifter 50.

For example, since counterbalance may be necessary when the washing machine rotates at a high speed, it is possible to keep the weight in balance by attaching the counterbalance part 92 formed of a material having non-magnetic properties.

In this case, as described above, for example, when the lifters 50 are located at positions by which an angle of the drum 30 is divided into three equal parts and the magnet 80 is provided at any one of the positions, the counterbalance parts 92 may be installed at the other two positions.

For example, since the dryer may not rotate at a high speed, the counterbalance part 92 for keep the weight in balance may not be installed.

Referring to FIG. 8, the controller 91 may be connected to the coil 90.

Figure 9:
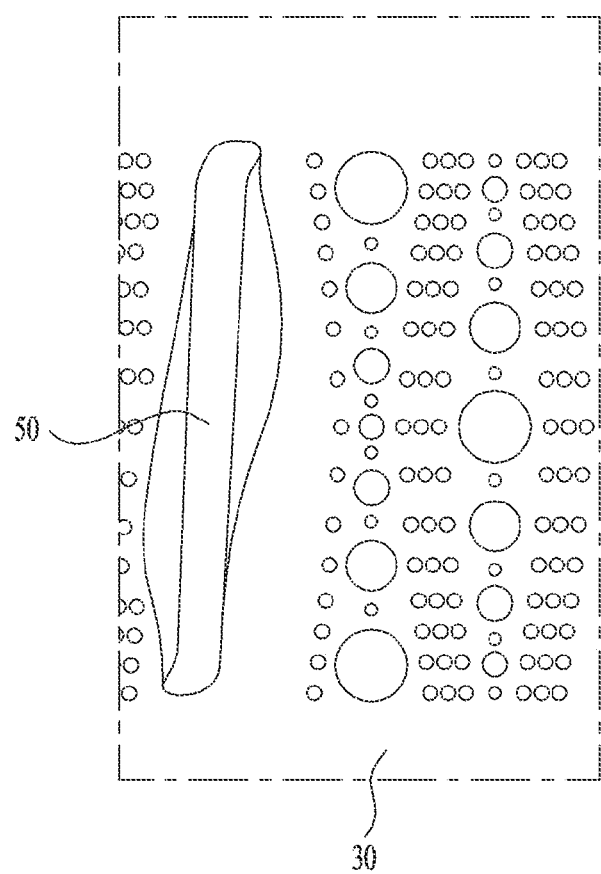
FIGS. 9 and 10 are partially enlarged views illustrating an installation state of a magnet of a clothes treatment apparatus according to an embodiment of the present disclosure.
Figure 10:
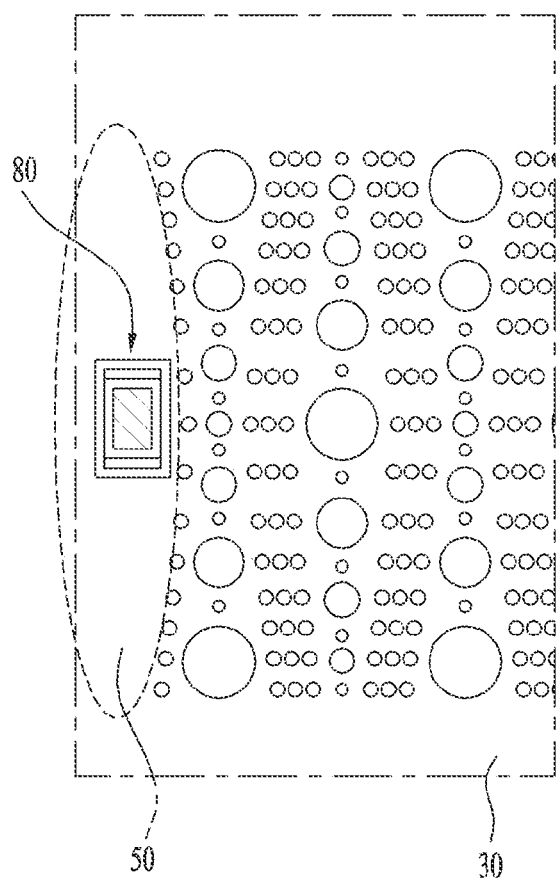

FIGS. 9 and 10 are partially enlarged views illustrating an installation position of a magnet of the clothes treatment apparatus according to an embodiment of the present disclosure.

FIG. 9 shows an inner side of the drum 30 and a position of a lifter 50. FIG. 10 shows an outer side of the drum 30 as the opposite side of the corresponding part. Referring to FIG. 10, it is shown that the magnet 80 may be installed at a portion of the outside of the drum 30 where the lifter 50 is located.

That is, referring to FIGS. 9 and 10, the magnet 80 may be installed at an outer surface of the drum 30 opposite to the position where the lifter 50 is installed on the inner surface of the drum 30. The magnet 80 may be located at a center of the position where the lifter 50 is installed.

Figure 11:
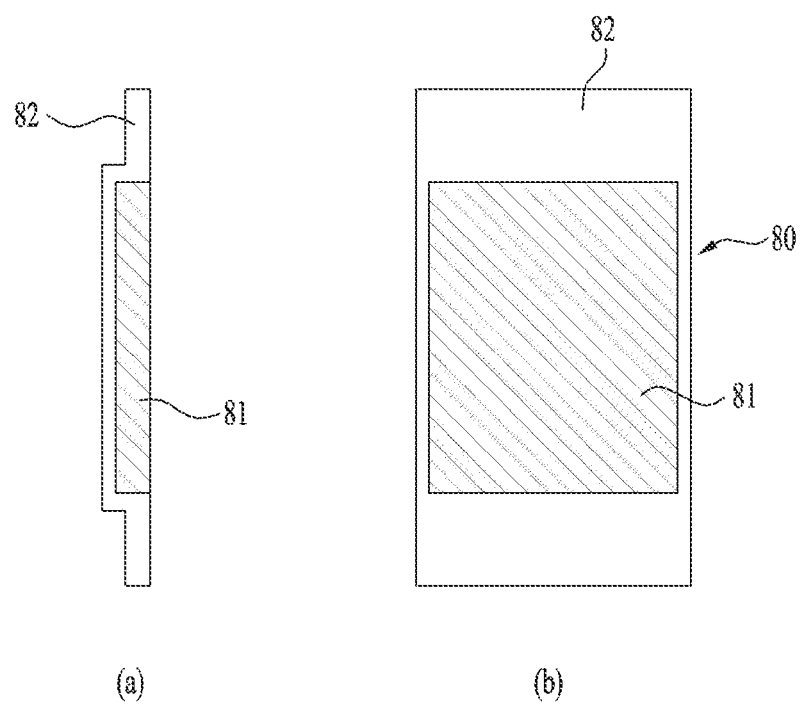
FIG. 11 is a diagram illustrating an example of a magnet of a clothes treatment apparatus according to an embodiment of the present disclosure.

FIG. 11 is a diagram illustrating an example of a magnet of a clothes treatment apparatus according to an embodiment of the present disclosure. FIG. 11(a) shows a side cross-section of the magnet 80, and FIG. 11(b) shows a front side of the magnet 80.

Referring to FIG. 11, the magnet 80 may include a magnet fixing part 82 and a magnet body 81 fixed by the magnet fixing part 82. That is, the magnet 80 may include the magnet body 81 and the magnet fixing part 82.

The magnet fixing part 82 may have a shape embracing the magnet body 81 and firmly fix the magnet body 81. The magnet fixing part 82 may be open to expose at least one surface of the magnet body 81. Here, the open surface of the magnet body 81 may be a surface facing the coil 90. That is, the magnet fixing part 82 may fix the magnet body 81 so that the surface of the magnet body 81 facing the coil 90 is open.

FIG. 12 is a graph illustrating a voltage induced in a coil of a clothes treatment apparatus according to an embodiment of the present disclosure.

When the load (drum) is rotated at a rotating speed of 46 rpm, which is a driving speed of a dryer or an integrated washer-dryer, after a permanent magnet having positive poles (N pole and S pole) is attached onto the load (drum) 30, it may be seen that a specific voltage is induced in the coil 90 at a point (X, Y) where a magnetic field of the permanent magnet is generated the strongest, as shown in FIG. 12.

In this case, as mentioned above, the voltage (counter electromotive force) induced in the coil 90 may vary depending on a magnetic flux density of the permanent magnet. In addition, the magnetic flux density of the permanent magnet may change depending on temperature, and therefore, temperature of the drum 30 in which the permanent magnet is installed may be estimated.

Figure 13:
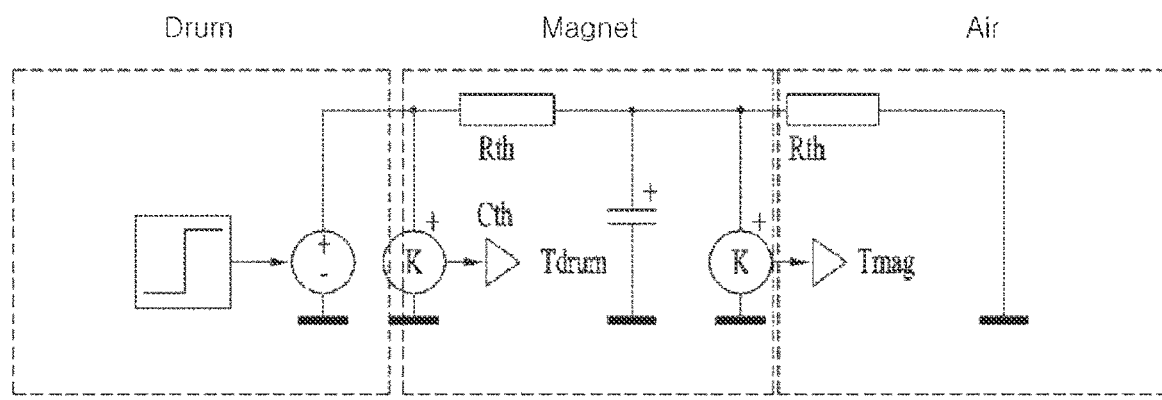
FIG. 13 is a diagram illustrating a thermal equivalent model of a clothes treatment apparatus according to an embodiment of the present disclosure.
Figure 14:
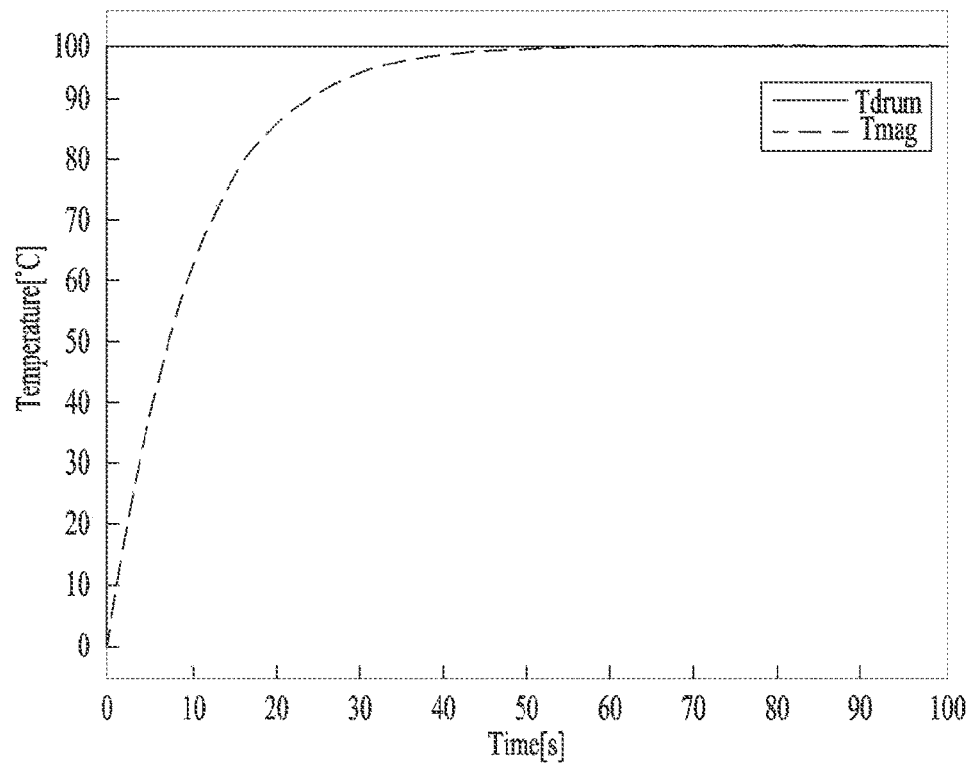
FIG. 14 is a graph showing temperature tracking of a magnet when the thermal equivalent model shown in FIG. 13 is used.

FIG. 13 is a diagram illustrating a thermal equivalent model of a clothes treatment apparatus according to an embodiment of the present disclosure. FIG. 14 is a graph showing temperature tracking of a magnet when the thermal equivalent model shown in FIG. 13 is used.

In order to verify the present disclosure, a simulation may be performed regarding a temperature estimation time for temperature of the load (drum) 30 and temperature of the magnet 80.

Here, a ferrite permanent magnet can be used as the magnet 80.

In one example, in analyzing thermal conductivity of the permanent magnet, parameters of the permanent magnet may be set to have thermal resistance of 0.2 [K/W], heat capacity of 50 [J/K], mass of 0.0625 [kg], and size of 50×40×5 [mm].

Based on these parameter, a thermal equivalent model as shown in FIG. 13 may be configured.

In FIG. 13, on the side of the drum 30, heat generated by the induction heater 70 may be regarded as power. On the side of the magnet 80, a circuit including a thermal resistance Rth, a capacitance Cth and a heat source K of the magnet may be configured, and temperature Tdrum of the drum 30 may be derived from the heat source K. In addition, on the side of air, the thermal resistance Rth and the heat source K of the air may be included, and the temperature Tmag of the magnet may be derived from the heat source K.

In this equivalent model, when temperature change of the permanent magnet is simulated under a condition where heat of 100° C. is applied to the load (drum) 30, it may be seen that about 30 seconds are taken to reach an error range within 5%, as shown in FIG. 14.

In the case of an integrated washer-dryer, temperature of the load (drum) may increase by up to 1.3° C./sec under the condition of a maximum output (for example, 1.9 kW), so it can be said that the time of 30 seconds to reach the temperature is allowable. Therefore, it can be seen that an embodiment of the present disclosure is applicable to a general washing machine.

Meanwhile, the thermal resistance in air may be considered.

When this simulation is performed, the thermal resistance of air may be 461 K/W under a condition where a distance between the load (the drum 30) and the ferrite permanent magnet is 30 mm.

Since the thermal resistance of air has a sufficiently large value of 461 K/W, a temperature difference between the load (drum) and the permanent magnet under a thermal equilibrium condition may occur less than 1.0'C.

Figure 15:
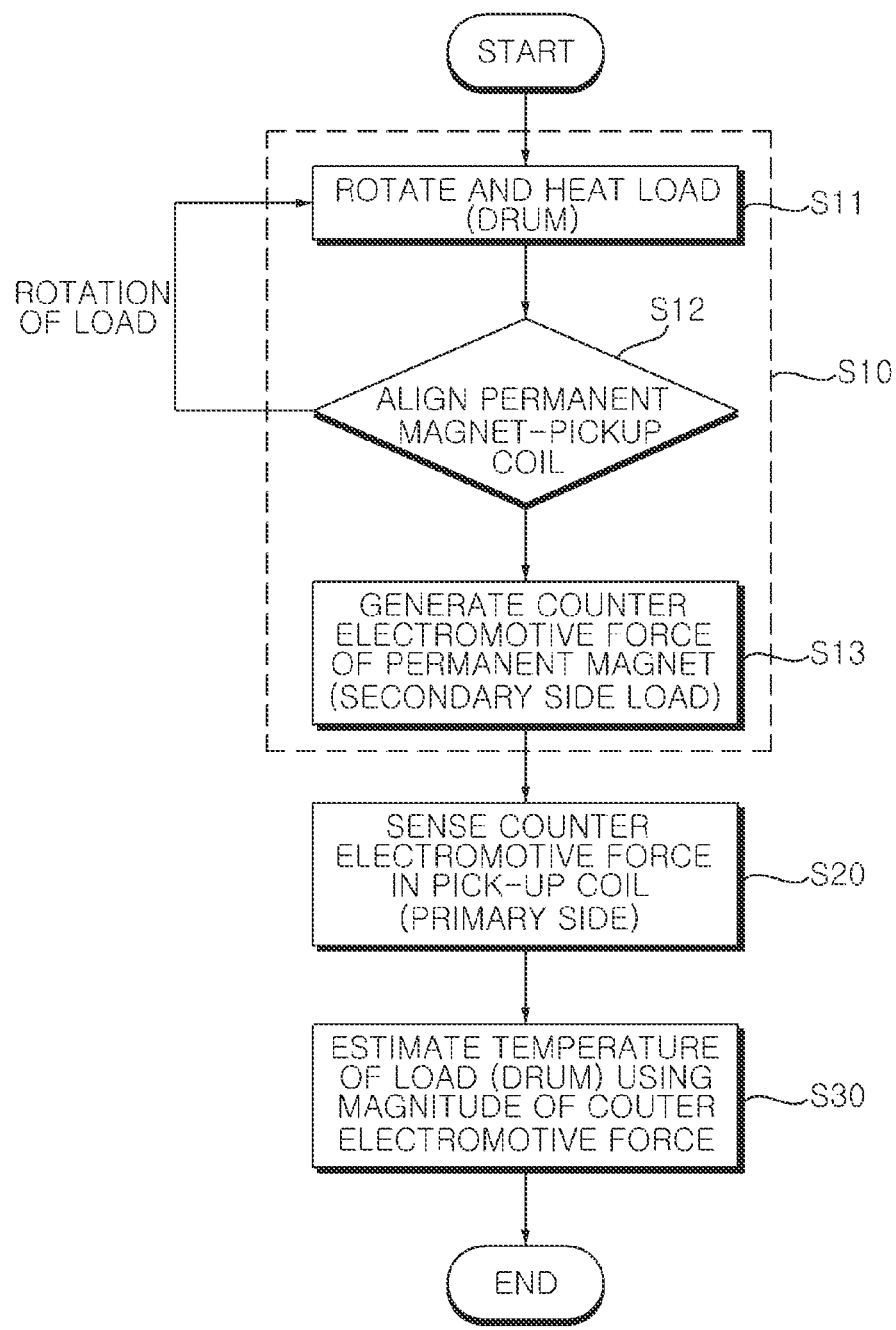
FIG. 15 is a flowchart illustrating a method of controlling a clothes treatment apparatus according to an embodiment of the present disclosure.

FIG. 15 is a flowchart illustrating a method of controlling a clothes treatment apparatus according to an embodiment of the present disclosure.

According to an embodiment of the present disclosure, temperature of the drum 30 may be estimated using the configuration as described with reference to FIG. 8.

That is, the temperature of the drum 30 may be estimated using the coil 90, which is installed in the tub 20, and the magnet 80, which is installed on the drum 30 and positioned to pass through a point which interacts with the coil 90 while the drum 30 rotates.

Hereinafter, a process of estimating the temperature of the drum 30 of the clothes treatment apparatus by using the coil 90 and the magnet 80 will be described in detail with reference to FIGS. 8 and 15 together.

First, operation 10 of driving the clothes treatment apparatus may be performed. In this case, as mentioned above, the clothes treatment apparatus may correspond to a washing machine, a dryer, and a dryer-integrated washing machine (integrated washer-dryer). Hereinafter, a washing machine will be described as a representative example of the clothes treatment apparatus of the present disclosure. However, the clothes treatment apparatus of the present disclosure is not limited thereto.

The operation S10 of driving the clothes treatment apparatus may include operation S11 of heating and rotating a load (drum) 30.

In addition, the operation S10 of driving the clothes treatment apparatus may include operation S12 of aligning the magnet (permanent magnet) 80 and the coil 90. The operation S12 of aligning the magnet 80 and the coil 90 may be performed automatically or manually in the washing machine. Also, in some cases, the operation S12 of aligning the magnet 80 and the coil 90 may be omitted.

When the operation S12 of aligning the magnet 80 and the coil 90 is performed, the operation S11 of heating and rotating the load (drum) 30 may be performed again after the operation S12.

In this case, a counter electromotive force may be generated in the coil 90 by rotation of the magnet (secondary side) 80 attached to the drum 30 in operation S13.

Thereafter, operation S20 of sensing a counter electromotive force generated in the coil (primary side) 90 through the controller 90 may be performed.

Then, operation S30 of estimating temperature of the drum 30 by using a magnitude of the counter electromotive force may be performed.

As mentioned above, a voltage (counter electromotive force) induced through the coil 90 may vary depending on a magnetic flux density of the permanent magnet. In addition, the magnetic flux density of the permanent magnet may change at a predetermined rate depending on the temperature, and thus, the temperature of the drum 30 in which the permanent magnet is installed may be estimated.

That is, in the operation S30 of estimating the temperature of the drum 30, the temperature of the drum 30 may be estimated by using a counter electromotive force value according to a change in the residual magnetic flux density of the magnet 80 depending on the temperature of the drum 30.

In other words, in the operation S30 of estimating the temperature of the drum 30, the temperature of the drum 30 may be estimated by using a characteristic that the voltage induced in the coil 90 decreases at a predetermined rate as the temperature of the magnet 80 increases.

According to the present disclosure as described above, it may be possible to accurately estimate the temperature of the drum by using a characteristic of the magnet in which the residual magnetic flux density decreases as the temperature increases.

In addition, it may be possible to estimate temperature regardless of a gap structurally caused due to a load (drum) and a tub.

In addition, it is possible to accurately estimate temperature even under a condition in which a load (drum) is rotating.

Without turning off a power device in order to estimate temperature, it is possible to continuously estimate the temperature, thereby yielding high efficiency when a product is applied.

Certain embodiments or other embodiments of the disclosure described above are not mutually exclusive or distinct from each other. Any or all elements of the embodiments of the disclosure described above may be combined with another or combined with each other in configuration or function For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A clothes treatment apparatus comprising:
a cabinet;
a drum rotatably disposed in the cabinet and configured to accommodate an object to be treated;
an induction heater including a heater coil, the induction heater disposed outside the drum and configured to heat the drum;
a magnet coupled to the drum;
a coil disposed an outside of the drum, the coil disposed at a position corresponding to the magnet in a longitudinal direction of a rotation axis of the drum so as to overlap the magnet in a radial direction of the drum based on a rotational position of the drum.

2. The clothes treatment apparatus of claim 1, wherein the magnet is disposed at a location where a straight line passing through the coil and a line perpendicular to the rotation axis of the drum meets the drum.

3. The clothes treatment apparatus of claim 1, wherein the magnet is disposed at an outer circumferential surface of the drum.

4. The clothes treatment apparatus of claim 1, further comprising:
a lifter disposed at an inner circumferential surface of the drum,
wherein the magnet is disposed at an outer surface of a portion of the drum where the lifter is disposed.

5. The clothes treatment apparatus of claim 4, wherein the drum comprises:
a body having a cylindrical shape; and
a plurality of through holes defined in the body.

6. The clothes treatment apparatus of claim 4,
wherein the lifter comprises a plurality of lifters disposed at regular intervals along a circumferential direction of the drum,
wherein the magnet is disposed at an outer surface of a portion of the drum where any one of the plurality of lifters is disposed, and
wherein the clothes treatment apparatus further comprises a non-magnetic counterbalance part disposed at the other lifters among the plurality of lifters.

7. The clothes treatment apparatus of claim 1, further comprising:
one or more non-magnetic counterbalance parts disposed at the drum,
wherein the magnet and the one or more counterbalance parts are disposed at regular intervals along a circumferential direction of the drum.

8. The clothes treatment apparatus of claim 1, wherein the coil is disposed at an opposite side of the induction heater with respect to a center of the drum.

9. The clothes treatment apparatus of claim 1, wherein the coil is disposed at a location within a range of ±60 degrees from a point opposite to the induction heater with respect to a center of the drum.

10. The clothes treatment apparatus of claim 1, further comprising:
a tub disposed inside the cabinet and accommodating the drum,
wherein the induction heater is disposed apart from the drum and coupled to the tub, and
wherein the coil is disposed in the tub.

11. The clothes treatment apparatus of claim 10, wherein the induction heater is disposed at an outer circumferential surface of the tub.

12. The clothes treatment apparatus of claim 10, wherein the drum is rotatably disposed in the tub, and
wherein the tub is configured to receive water therein.

13. The clothes treatment apparatus of claim 1, further comprising:
a controller coupled to the coil and configured to estimate a temperature of the drum.

14. The clothes treatment apparatus of claim 1, wherein the magnet is configured to, based on a rotation of the drum, change the residual magnetic flux density.

15. The clothes treatment apparatus of claim 14, wherein the magnet is configured to, based on the change in its magnetic flux density, induce a counter electromotive force in the coil, and wherein the clothes treatment apparatus further comprises a controller coupled to the coil and configured to, based on the counter electromotive force, estimate a temperature of the drum.

16. The clothes treatment apparatus of claim 1, wherein the coil is disposed at an inner surface of the cabinet, and wherein the coil is coupled to a bottom surface of the cabinet.

17. The clothes treatment apparatus of claim 1, wherein the magnet is a ferrite magnet.

18. The clothes treatment apparatus of claim 1, wherein the magnet has a residual magnetic flux density that changes based on temperature.

* * * * *